(12) United States Patent
Chiproot

(10) Patent No.: US 10,364,929 B2
(45) Date of Patent: Jul. 30, 2019

(54) PIPE COUPLING ENCAPSULATION ASSEMBLY

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Tel Aviv (IL)

( * ) Notice: Subject to any disclaimer, the term of this patent is extended or adjusted under 35 U.S.C. 154(b) by 168 days.

(21) Appl. No.: 15/458,283

(22) Filed: Mar. 14, 2017

(65) Prior Publication Data

US 2018/0266614 A1 Sep. 20, 2018

(51) Int. Cl.
| | | |
|---|---|---|
| *F16L 21/06* | (2006.01) | |
| *F16L 55/172* | (2006.01) | |
| *F16L 37/26* | (2006.01) | |
| *F16L 55/178* | (2006.01) | |
| *F16L 21/08* | (2006.01) | |
| *F16L 25/14* | (2006.01) | |

(52) U.S. Cl.
CPC .............. *F16L 55/172* (2013.01); *F16L 37/26* (2013.01); *F16L 55/178* (2013.01); *F16L 21/065* (2013.01); *F16L 21/08* (2013.01); *F16L 25/14* (2013.01)

(58) Field of Classification Search
CPC ....... F16L 21/02; F16L 21/005; F16L 21/065; F16L 21/06
USPC .................................................. 285/373, 15
See application file for complete search history.

(56) References Cited

U.S. PATENT DOCUMENTS

| | | | | | |
|---|---|---|---|---|---|
| 3,315,991 | A | * | 4/1967 | Davis ...................... | F16L 21/06 285/373 |
| 4,026,586 | A | * | 5/1977 | Kennedy, Jr. ......... | F16L 21/005 285/373 |
| 4,575,129 | A | * | 3/1986 | Porowski .............. | F16L 21/007 285/15 |
| 5,310,223 | A | * | 5/1994 | Straub ................... | F16L 21/005 285/373 |
| 6,328,352 | B1 | * | 12/2001 | Geppert ................. | F16L 21/06 285/373 |
| 8,292,331 | B2 | * | 10/2012 | Sudar .................... | F16L 21/005 285/373 |
| 8,430,432 | B2 | * | 4/2013 | Webb .................... | F16L 21/005 285/373 |

(Continued)

FOREIGN PATENT DOCUMENTS

| | | | | |
|---|---|---|---|---|
| DE | 102012001439 | A1 * | 8/2013 | ............ F16L 21/065 |
| DE | 102016105627 | A1 * | 9/2017 | ............ F16L 21/005 |

(Continued)

*Primary Examiner* — David Bochna
(74) *Attorney, Agent, or Firm* — Dekel Patent Ltd.; David Klein

(57) ABSTRACT

A pipe coupling encapsulation assembly includes a repair coupling including an elastomeric seal, clamp members and one or more tightening elements for tightening the clamp members towards each other, and a grip member assembled in the repair coupling. The grip member is formed into an at least partially circumferential band. The band includes a plurality of pipe interface members with protrusions capable of digging into an outer surface of a pipe being sealed. The grip member includes a plurality of radially inner and radially outer bends. The pipe interface members and the protrusions are located at radially inward surfaces of the inner bends.

10 Claims, 1 Drawing Sheet

(56) References Cited

U.S. PATENT DOCUMENTS

2012/0217745 A1* 8/2012 Pires Cabado ....... F16L 21/065
285/410

FOREIGN PATENT DOCUMENTS

| WO | WO-0046537 A1 * | 8/2000 | .............. F16L 21/06 |
| WO | WO-2010035924 A1 * | 4/2010 | ............ F16L 21/005 |

* cited by examiner

PIPE COUPLING ENCAPSULATION ASSEMBLY

FIELD OF THE INVENTION

The present invention relates generally to pipe coupling assemblies, such as those used to sealingly connect pipes together or to repair breaks or leaks in pipes, and particularly to a pipe coupling encapsulation assembly in which the pipe coupling fits over existing bell-shaped joints and sleeve joints and seals the joint.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

Pipeline leakage must be prevented for both economic and environmental reasons, depending on the nature of the fluid being transported. When needed repairs are inevitably carried out under field conditions, and in many situations there is a requirement that the flow of fluid in the pipeline may not be interrupted for any reason. Thus replacement of a faulty pipe joint is not an option.

Prior art seals are not capable of being used externally over an existing coupling or existing bell joint. Prior art seals lack the internal space needed if the repair seal is to be applied over and around an existing but leaking pipe joint. A further problem with many prior-art seals arises when the fluid being transported is under high pressure. This results in the seal lips being gradually pushed outwards, eventually leading to complete seal failure.

A solution to the above problems are split seal encapsulation pipe repair assemblies. The encapsulation seal assembly fits over existing bell-shaped joints, sleeve joints and the like, and seals the joint. The encapsulation seal assembly includes two metal half-rings that are bolted together at top and bottom flanges of the half-rings. Two elastomeric sealing half-rings are permanently attached to the inside of the two metal half-rings, and these sealing half-rings are clamped on both sides of the leak to stop the leak.

A challenge that faces all encapsulation seal assemblies is the seal must not only withstand radial forces but also axial forces (along the axial length of the pipes) that are created by the force of the fluid flowing through the joints that seal the pipes. These forces tend to urge the seal away from the pipe surface, which can cause leakage.

SUMMARY OF THE INVENTION

The present invention seeks to provide an improved assembly for pipe coupling encapsulation, as is described more in detail further below.

There is provided in accordance with an embodiment of the present invention a pipe coupling encapsulation assembly including a repair coupling including an elastomeric seal, clamp members and one or more tightening elements for tightening the clamp members towards each other, and a grip member assembled in the repair coupling, the grip member formed into an at least partially circumferential band, the band including a plurality of pipe interface members with protrusions capable of digging into an outer surface of a pipe being sealed, and wherein the grip member includes a plurality of radially inner and radially outer bends, wherein the pipe interface members and the protrusions are located at radially inward surfaces of the inner bends.

In accordance with an embodiment of the present invention the radially outer bends are pivot lines for the pipe interface members to bend radially inwards.

In accordance with an embodiment of the present invention a row of at least one of the protrusions is located at each of the pipe interface members.

In accordance with an embodiment of the present invention surfaces of the band that extend between the pipe interface members and the outer bends have apertures formed therein.

In accordance with an embodiment of the present invention an axial length of the grip member is such that the grip member is embedded in the elastomeric seal and the protrusions protrude radially inwards of the elastomeric seal.

In accordance with an embodiment of the present invention an axial length of the grip member is such that more than one grip member fits in the elastomeric seal.

In accordance with an embodiment of the present invention at least a portion of the grip member is external to the elastomeric seal.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figure 1:
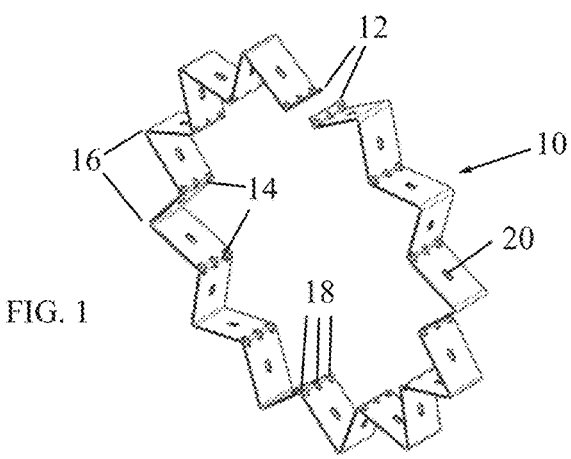
FIG. 1 is a simplified pictorial illustration of a grip member for a pipe coupling encapsulation assembly in accordance with a non-limiting embodiment of the present invention.

Reference is now made to FIG. 1, which illustrates a grip member 10 for a pipe coupling encapsulation assembly, constructed and operative in accordance with a non-limiting embodiment of the present invention.

Grip member 10 includes a band, constructed of a flexible strong material, such as but not limited to, stainless steel, which is bent or otherwise formed into an at least partially (could be fully) circumferential band. For example, the band may subtend an angle of only a few degrees and many such bands may be used in the assembly. In one embodiment, the ends 12 of the band do not meet each other, and the circumferential band subtends an arc of at least 180°. In another embodiment, the ends 12 of the band do not meet each other, and the circumferential band subtends an arc of at least 270°. In another embodiment, the ends 12 of the band do not meet each other, and the circumferential band subtends an arc of at least 330°. Yet in another embodiment, the ends 12 of the band do meet each other, and the circumferential band is a continuous band over 360°. Each embodiment may be used for a particular sealing solution, depending on the fluid forces present, which diminish or increase the radial and axial forces.

Grip member 10 includes a plurality of pipe interface members 14, that is, the members that will touch the outer surface of the pipe when in use. In the illustrated embodiment, grip member 10 is bent in a multiple star or sinusoidal or corrugated formation (or wavy and the like) that includes V-bends (little or no bend radius) or U-bends (with an easily visible bend radius). The radially inner bends are the pipe interface members 14. The radially outer bends 16 serve as fulcrums or pivot lines for the pipe interface members 14 to bend radially inwards towards a pipe and dig into the outer surface of the pipe. In other words, when the repair coupling is tightened, the tightening forces are applied on the radially outer bends 16 and the radially outer bends 16 transfer the forces to the radially inner bends (the pipe interface members 14) so as to press them against the pipe being sealed.

The pipe interface members 14 may include protrusions 18, such as but not limited to, points, lances and the like, that can dig into the outer surface of the pipe being sealed. Protrusions 18 are located at radially inward surfaces of the inner bends 14. It is noted that before tightening the repair coupling, the protrusions 18 may initially not protrude outwards of the elastomeric seal but they protrude outwards after tightening so they can dig into the pipe. Alternatively, the protrusions may protrude outwards of the elastomeric seal even before tightening the repair coupling. In the illustrated embodiment, there is a row of three protrusions 18 at each pipe interface member 14, but the invention can be carried out with just one or many more such protrusions 18. The surfaces of the band that extend between the pipe interface members 14 and the outer bends 16 may have apertures 20 formed therein so that the elastomeric material of the seal can enter these apertures when the repair coupling is tightened. The apertures 20 may be provided for stress relief, minimizing weight or other reasons.

Figure 2:
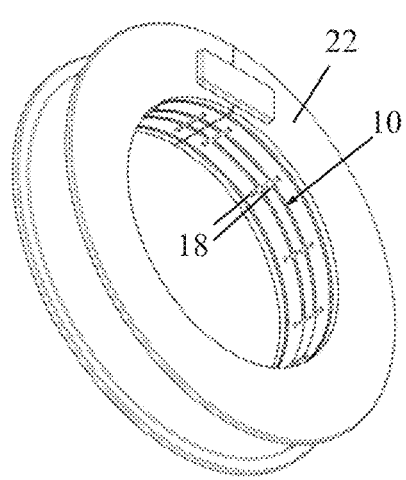
FIG. 2 is a simplified pictorial illustration of the grip member installed in the pipe coupling encapsulation assembly, in accordance with a non-limiting embodiment of the present invention.
Figure 3:
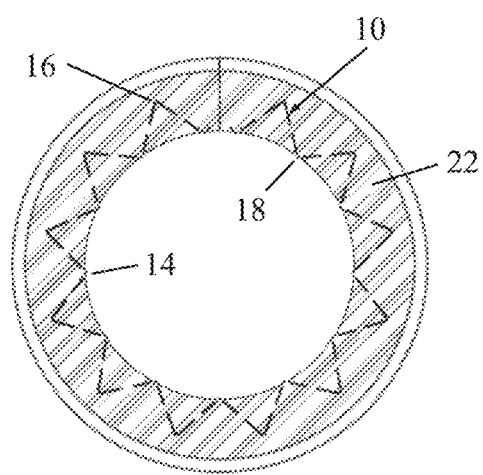
FIG. 3 is a simplified cutaway illustration of the grip member in a seal of the pipe coupling encapsulation assembly.

The axial length of grip member 10 may be chosen for a particular sealing solution. For example, as seen in FIGS. 2 and 3, the axial length of grip member 10 may be selected so that grip member 10 is embedded in an elastomeric seal 22 of the pipe coupling encapsulation assembly. The protrusions 18 protrude radially inwards of seal 22 so they can contact the pipe being sealed. In another embodiment, the axial length of grip member 10 may be sufficiently narrow so that more than one grip member 10 may fit in the elastomeric seal 22. In yet another embodiment, grip member 10 may be either external to or seal 22, or alternatively may extend out of the seal 22, as indicated by broken lines 23 in FIG. 4.

Figure 4:
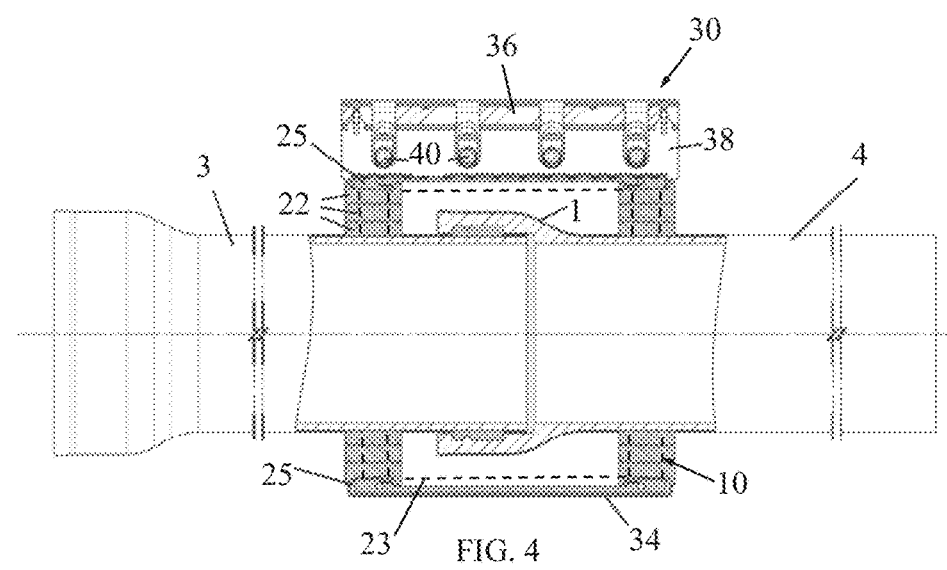
FIG. 4 is a sectional illustration of a bell joint coupling fully repaired by the pipe coupling encapsulation assembly in accordance with a non-limiting embodiment of the present invention.

FIG. 4 illustrates a bell joint coupling 1 fully repaired by a pipe coupling encapsulation assembly 30 in accordance with a non-limiting embodiment of the present invention. The bell joint coupling 1 is at the end of a pipe 4 and is connected to another pipe 3. (Similarly, the invention may be used to repair other couplings, such as a sleeve joint coupling.)

The pipe coupling encapsulation assembly 30 is provided to repair the leaking pipe joints, without having to interrupt flow through the pipes and joint couplings. The pipe coupling encapsulation assembly 30 may include more than one elastomeric seal 22, such as two elastomeric partial rings with an additional seal 25, which may all be made of natural or synthetic rubber or other suitable material. Each elastomeric partial ring is placed around one of the pipes on opposite sides of the leaking joint coupling.

The pipe coupling encapsulation assembly 30 includes a repair coupling 34, which is typically, but not necessarily, made of metal. Opposing clamp members 36 extend outwards from ends of repair coupling 34. Clamp members 38 are clamped and tightened together with one or more tightening elements 40, such as but not limited to, bolts which are tightened by nuts.

In use, a worker places the pipe coupling encapsulation assembly 30 around the leaking area, such that the seals 22 are located around the pipes 3 and 4 on opposite sides of the leaking joint coupling 1. The worker tightens opposing clamp members 38 towards each other with tightening elements 40 and the repair is complete. When the pipe coupling encapsulation assembly 30 is tightened around the leaking area, the protrusions 18 of grip member 10 dig into pipes 3 and 4 and resist axial and radial forces of the fluid flowing through the repair coupling and the joint coupling.

What is claimed is:

1. A pipe coupling encapsulation assembly comprising:
   a repair coupling comprising an elastomeric seal, clamp members and one or more tightening elements for tightening said clamp members towards each other; and
   a grip member assembled in said repair coupling, said grip member formed into an at least partially circumferential band, said band comprising a plurality of pipe interface members with protrusions capable of digging into an outer surface of a pipe being sealed, and wherein said grip member comprises a plurality of radially inner and radially outer bends, wherein said pipe interface members and said protrusions are located at radially inward surfaces of said inner bends;
   wherein a row of at least one of said protrusions is located at each of said pipe interface members.

2. The pipe coupling encapsulation assembly according to claim 1, wherein said radially outer bends are pivot lines for said pipe interface members to bend radially inwards.

3. The pipe coupling encapsulation assembly according to claim 1, wherein ends of said band do not meet each other, and said band subtends an arc of at least 180°.

4. The pipe coupling encapsulation assembly according to claim 1, wherein ends of said band do not meet each other, and said band subtends an arc of at least 270°.

5. The pipe coupling encapsulation assembly according to claim 1, wherein ends of said band do not meet each other, and said band subtends an arc of at least 330°.

6. The pipe coupling encapsulation assembly according to claim 1, wherein ends of said band meet each other, and said band is a continuous band over 360°.

7. A pipe coupling encapsulation assembly comprising:
   a repair coupling comprising an elastomeric seal, clamp members and one or more tightening elements for tightening said clamp members towards each other; and
   a grip member assembled in said repair coupling, said grip member formed into an at least partially circumferential band, said band comprising a plurality of pipe interface members with protrusions capable of digging into an outer surface of a pipe being sealed, and wherein said grip member comprises a plurality of radially inner and radially outer bends, wherein said pipe interface member and said protrusions are located at radially inward surfaces of said inner bends, wherein surfaces of said band that extend between said pipe interface members and said outer bends have apertures formed therein.

8. A pipe coupling encapsulation assembly comprising:
   a repair coupling comprising an elastomeric seal, clamp members and one or more tightening elements for tightening said clamp members towards each other; and a grip member assembled in said repair coupling, said grip member formed into an at least partially circumferential band, said band comprising a plurality of pipe interface members with protrusions capable of digging into an outer surface of a pipe being sealed, and wherein said grip member comprises a plurality of radially inner and radially outer bends, wherein said pipe interface members and said protrusions are located at radially inward surfaces of said inner bends, wherein an axial length of said grip member is such that said grip member is embedded in said elastomeric seal and said protrusions protrude radially inwards of said elastomeric seal.

9. The pipe coupling encapsulation assembly according to claim 8, wherein an axial length of said grip member is such that more than one grip member fits in said elastomeric seal.

10. The pipe coupling encapsulation assembly according to claim 8, wherein at least a portion of said grip member is external to said elastomeric seal.

\* \* \* \* \*